Nov. 10, 1964 N. A. HERRICK 3,156,862
ELECTRICAL FLAW DETECTOR APPARATUS HAVING NULL
PLANE POSITIONED AS WELL AS ELECTRICALLY
Filed Dec. 15, 1961 BALANCED COIL ARRANGEMENTS
2 Sheets-Sheet 1
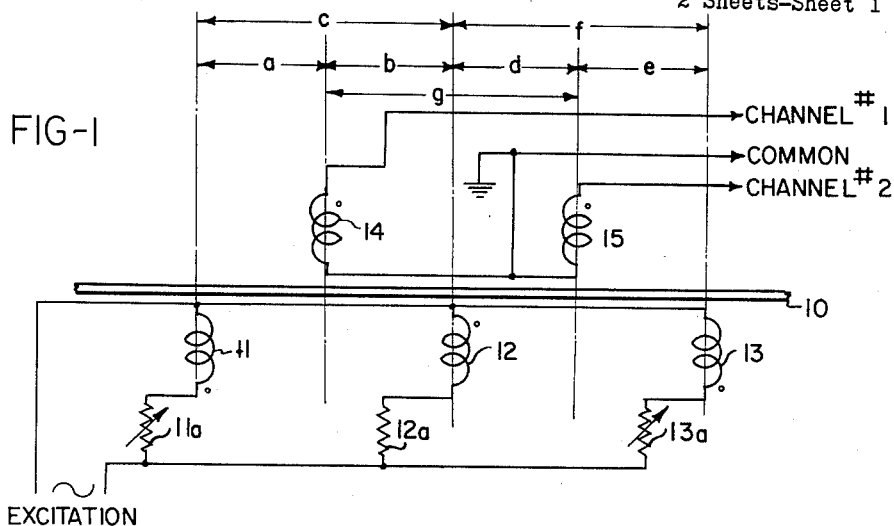
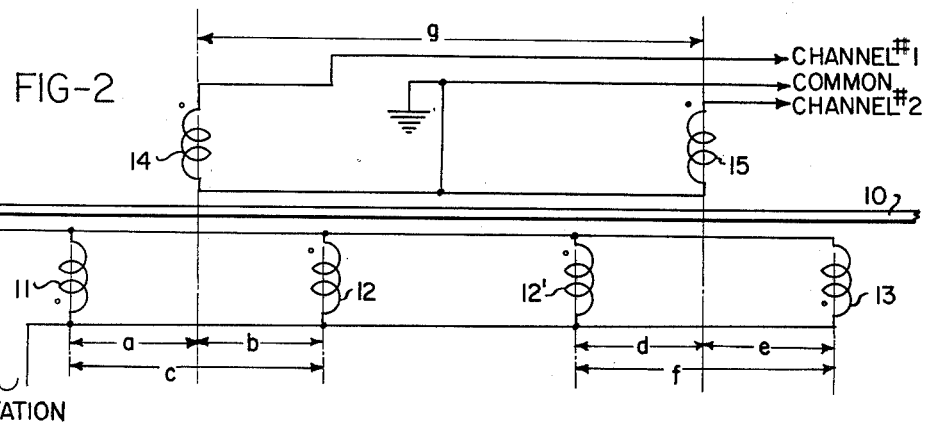
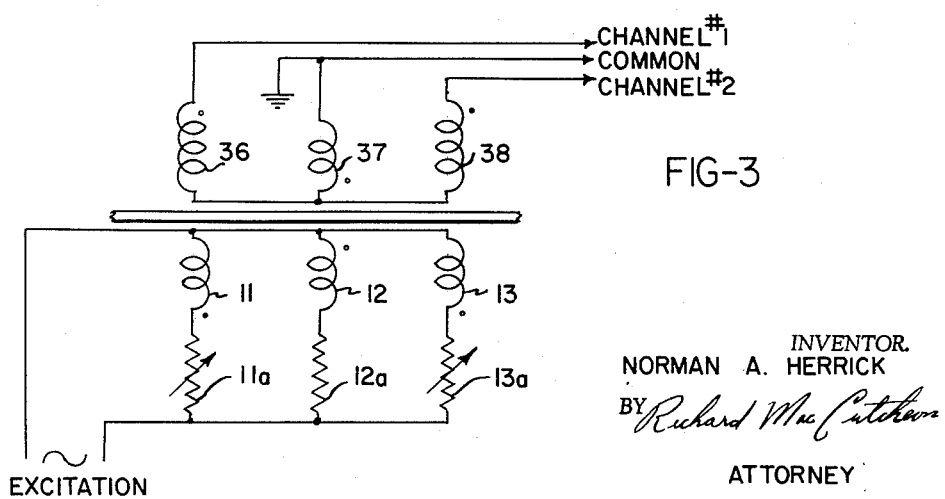
INVENTOR.
NORMAN A. HERRICK
BY Richard MacCutcheon
ATTORNEY Nov. 10, 1964   N. A. HERRICK   3,156,862
ELECTRICAL FLAW DETECTOR APPARATUS HAVING NULL
PLANE POSITIONED AS WELL AS ELECTRICALLY
BALANCED COIL ARRANGEMENTS
Filed Dec. 15, 1961   2 Sheets-Sheet 2
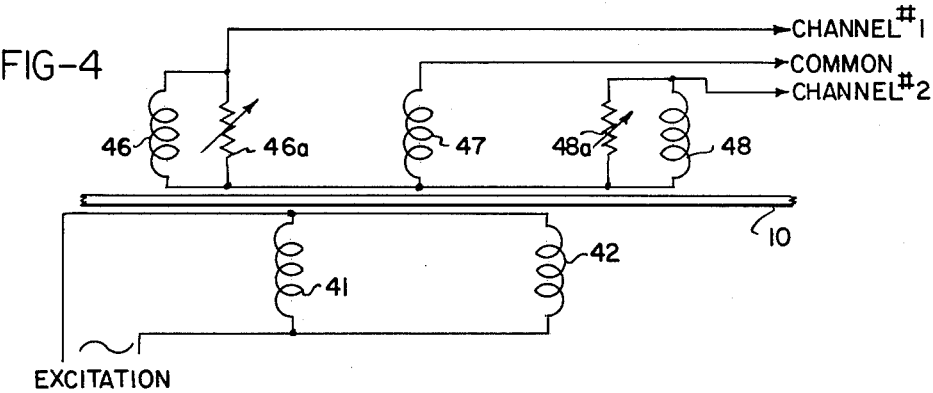
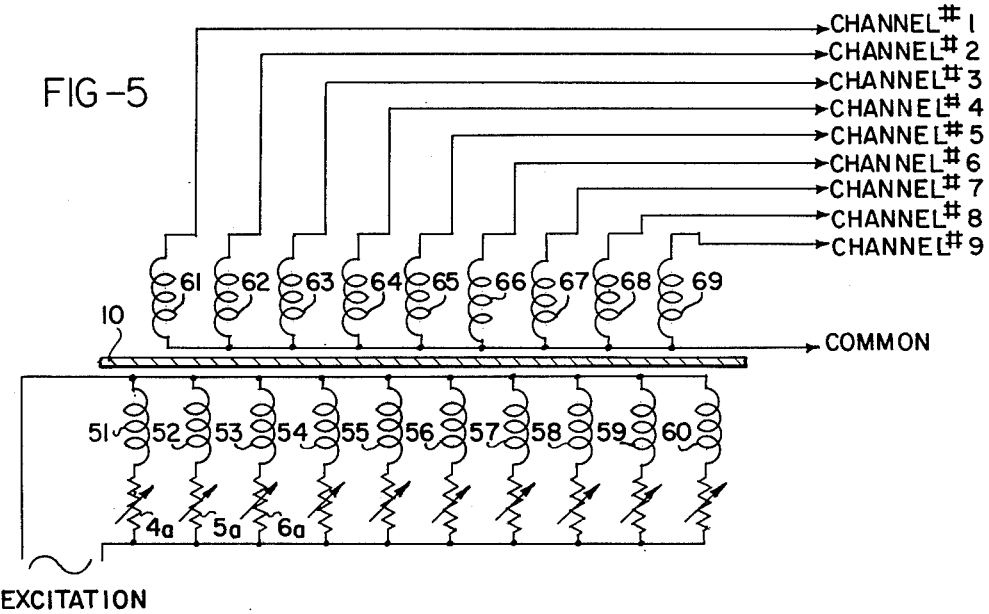
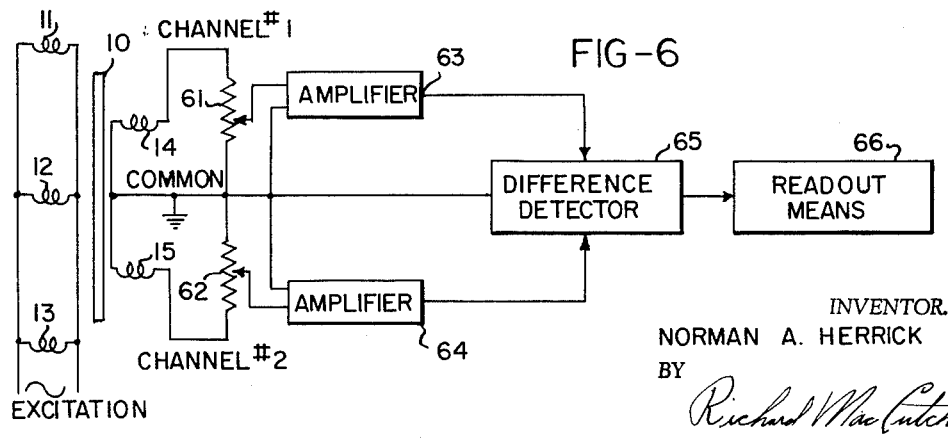
INVENTOR.
NORMAN A. HERRICK
BY
*Richard MacCutcheon*
ATTORNEY United States Patent Office 3,156,862
Patented Nov. 10, 1964

3,156,862
ELECTRICAL FLAW DETECTOR APPARATUS HAVING NULL PLANE POSITIONED AS WELL AS ELECTRICALLY BALANCED COIL ARRANGEMENTS
Norman A. Herrick, Euclid, Ohio, assignor to Assembly Products, Inc., Chesterland, Ohio, a corporation of Ohio
Filed Dec. 15, 1961, Ser. No. 159,497
2 Claims. (Cl. 324—34)

This invention relates to equipment for non-destructively testing materials which materials are in the form of metallic sheets.

In a copending application, S.N. 94,472, filed March 9, 1961 by George F. Quittner, and assigned to the assignee of the present invention there is disclosed and claimed apparatus for sensing welds, laminations and other flaws and discontinuities in electrically conductive materials having shapes relatively extended in two dimensions as compared with a third. The technique described may utilize two or more exciting coils on one side of the sheet material and laterally separated. Exciter coils are positioned with their axes essentially perpendicular to one broad face of the sample, and substantially coaxial with the exciter coils are sensing coils on the opposite side of the sample. Interpreting means disclosed include separate amplifying channels for the various sensing coils, means for sensing differences between the signals of channel pairs, and means for reading out the differences found. In that application each signal channel normally carries a significant alternating voltage, null being achieved by the comparison (generally, subtraction) of such voltage.

Experience with this type of information transducer shows that for some applications it has certain limitations. In particular, when a change of sample thickness occurs, rebalancing of the difference detecting device is sometimes required, possibly due to amplification and detection equipment non-linearities. In addition the equipment shows more sensitivity to sample tilt than is desirable under some industrial conditions. Further, like every null technique, it could be improved upon only if some means is found for reducing residual voltage at null.

It is an object of the present invention to provide simple means for overcoming the above mentioned difficulties.

Other objects and advantages will become apparent and the invention may be better understood from consideration of the following description taken in connection with the accompanying drawing in which:

FIG. 1 is a simplified diagram of a preferred arrangement according to my invention;
FIG. 2 shows an alternative arrangement;
FIG. 3 shows a modification;
FIGS. 4 and 5 show other modifications; and
FIG. 6 shows connections, which, for example, are from the preferred arrangement of FIG. 1, to amplifier, difference detector and readout means.

In FIG. 1 the sheet sample 10 is shown positioned between excitation coils 11, 12 and 13, on the one hand, and sensing coils 14 and 15 on the other hand, the axis of all five coils being substantially parallel and coplanar and in a plane substantially perpendicular to the broad faces of the sample 10. The sample should extend far enough through the plane of coil axes so that substantially all the alternating magnetic field causing signal generation in coils 14 and 15 radiate secondarily from sample 10, rather than passing from excitation coils through air alone to sensing coils.

As indicated by the dot convention, in FIG. 1 all coils must be connected for proper magnetic polarity so that at any excitation-current-flowing-instant, the polarity of coil 12 is opposite to the polarities of coils 11 and 13, etc. If coils 11, 12 and 13 were identical in all respects, and lead resistances were identical and sample 10 everywhere homogeneous, flat and symmetrically positioned, the parallel connected coils would generate three identical fields but, with the polarities shown, the center coil would be oppositely phased, and the secondary magnetic fields on the sensing side of sample 10 would similarly be identical under these ideal conditions. It is part of my invention or discovery that there is the existence of a "null plane" on each side of the exciter coil 12, this plane being perpendicular to the sample plane, and constituting the locus of all points equidistant from the axes of the nearest adjacent exciter coils. That is to say, in FIG. 1, $a=b$ and $2a=2b=c$, just as $d=e$ and $2d=2e=f$.

In practice the coils, lead resistances, geometry, etc., are not perfectly ideal and while such a null plane exists, it is not precisely planer nor precisely equidistant from the two relevant coil axes. The strength of the far exciter coil field may affect the position of the null as well. For these reasons the addition of field strength regulating resistors 11a, 12a, 13a has been found helpful. With such resistors, after the transducer is completely assembled, in effect the null may be moved "electrically" to a point at which an associated sensing coil 14 or 15 is already placed.

For convenience refer next to FIG. 6. Here the preferred arrangement of FIG. 1 (for simplicity without the resistors mentioned) is shown to provide a channel 1 and a channel 2 the outputs of which are taken through manual adjustment potentiometers 61 and 62 to conventional amplifiers such as those indicated by the blocks 63 and 64. The amplifiers in turn supply a difference detector shown in block form at 65, and which may be a well known type (e.g., a common cathode resistor difference amplifier) see for example, copending application of George F. Quittner, S.N. 82,348, filed January 12, 1961 and assigned to the assignee of the present invention. A thus detected difference is taken to readout means as shown in block form at 66 and which may comprise conventional lights, meter, contact meter, etc. (see, for example, the above mentioned copending application S.N. 94,472). It will be observed that further signal reduction may be obtained by correct adjustment of the variable tapped resistors 11a etc. (of FIG. 1) or proper physical movement of one or more of the five coils (of FIG. 1) and with the preferred embodiment (FIG. 1 or 6) if the sample is homogeneous the only output voltage from the sensing coils 14 and 15 will be a "residual" voltage due to wave form distortions (originating in exciter current) or due to the magnetic hysteresis curve of the sample, etc. Some of this residual voltage is the same for both information channels, and (if the coils are connected in proper phase relationship and if a suitable difference detector circuit is selected) thus subtracted.

In various applications the distances most appropriate for "a" through "f" (FIG. 1) may vary. For example, in testing for certain types of small defects it may be desirable to have "c" and "f" on the order of 1 or 2 inches. For other applications it may be preferable to have "c" and "f" five to ten or more times as large, in which case the separation of coils 11, 12 and 13 may be so great as to undesirably weaken the fields available for coils 14 and 15 at their generally central locations. In such cases the embodiment of FIG. 2 is useful.

In FIG. 2 the magnetic relationship seen by sensing coils 14 and 15 are equivalent to those of FIG. 1, but instead of using a single oppositely phased exciter coil 12 to provide opposing field for both pickup coils 14 and 15, each exciter coil 11 and 13 has relatively nearby an oppositely phased exciter coil 12 and 12', respectively.

The separation distance may now be as great as desired.

It is part of my invention and discovery that it is most practical to have the sensing coils arranged for active null output even before amplification and/or difference detection. By use of this technique there is reduced sensitivity to sample motion, smaller residual null voltages in final readout signal, and little change required in either transducer or electronic null adjustments for substantial changes in sample thickness or character.

By the term "active null," I mean to differentiate between a null output which exists because there is little or no alternating magnetic field present (and which might be termed a "passive null"), and the situation afforded by my invention where the null exists because of a unique geometric position in relatively strong alternating magnetic fields, any minute positional change of the coils in which produces a significant signal increase.

It will be apparent that there are many equivalents of the structure shown which will achieve the desired objects, even though superficially some of these structures may not appear equivalent.

In FIG. 3, a new sensing coil has been added in such manner that a sensing coil 37 subtracts a voltage from each of two coils 36 and 38 which now are on excitation-coil-axis positions. In this manner channel 1 and channel 2, without the presence of a sample flaw, show only minimal null output.

The modification illustrated in FIG. 4 results from a combination and inversion of FIGS. 1 and 3. Here the single magnetic field generated by coil 41 is sensed by coils 46 and 47 connected subtractively, any geometrical or electrical non-idealness being compensated by a shunt resistor 46a analogous to the series resistors 11a and 13a in FIG. 1.

It is assumed that in each of the FIGS. 1, 2, 3 and 4 the sheet is shown from left to right generally along its length (the direction in which it travels). In FIG. 5 the sheet is shown as cross-section (across its width) to show an example, which may be desirable for certain circumstances, where the invention is extrapolated to a greater number of information channels permitting continuous inspection of a relatively wide sheet.

While I have illustrated and described specific embodiments, once the basic structures described are understood, many equivalents, modifications and extensions will occur to those skilled in the art, and I intend to have my invention defined only by the accompanying claims taken with all reasonable equivalents.

I claim:
1. In apparatus for testing an electrically conductive material sheet which is relatively long and wide as compared with its thickness,
   (a) an alternating current source of excitation power,
   (b) at least three excitation coils on one side of said sheet in the direction of its thickness dimension, said coils having axes which are mutually parallel and coplanar whereby one of the coils is found between the other two,
   (c) a pair of sensing coils arranged with mutually parallel axes which are substantially coplanar with those of the excitation coils while sensing coils are on the opposite side of the sheet from the excitation coils,
   (d) conductor means connected to one of said sensing coils to form a first signal channel,
   (e) conductor means connected to the other of said sensing coils to form a secod signal channel,
   (f) difference detection means arranged to compare the signals in the two channels, and
   (g) conductors connected from said alternating current source to said excitation coils and which conductors establish connections which, with respect to winding direction of each of said coils, establishes null planes between excitation coils, the sensing coils being arranged to have their axes located substantially each in a different null plane.

2. In apparatus for detecting a flaw in magnetic or electrically conductive material having a thickness as its minor dimension, an alternating current source of excitation power, three excitation coils located on one side of said sheet and by their connections to said source characterized by having a middle coil polarized oppositely to the polarization of two outside coils, three pickup coils respectively arranged coaxial one with each of the excitation coils while on the opposite side of the sheet therefrom, and conductor means connected to form two information channels each including an outside pickup coil and the common center pickup coil.

References Cited in the file of this patent
UNITED STATES PATENTS

| | | |
|---|---|---|
| 2,057,835 | Karajan et al. | Oct. 20, 1936 |
| 2,598,252 | Gossick | May 27, 1952 |
| 3,020,472 | Cauley | Feb. 6, 1962 |